A. HAY.
Car Spring.
No. 25,264.
2 Sheets—Sheet 1.
Patented Aug. 30, 1859.
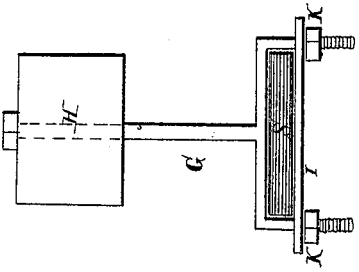
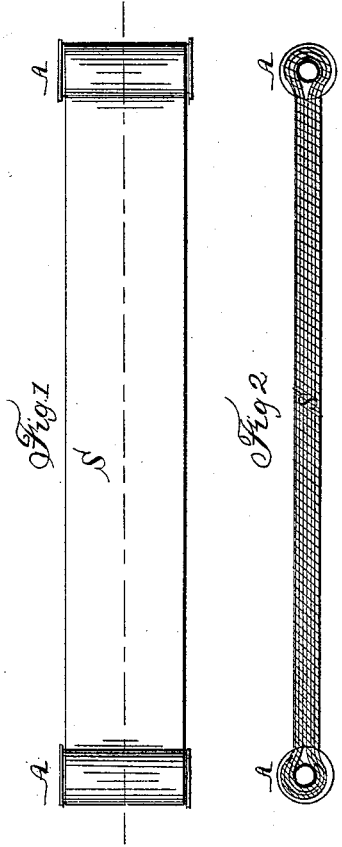
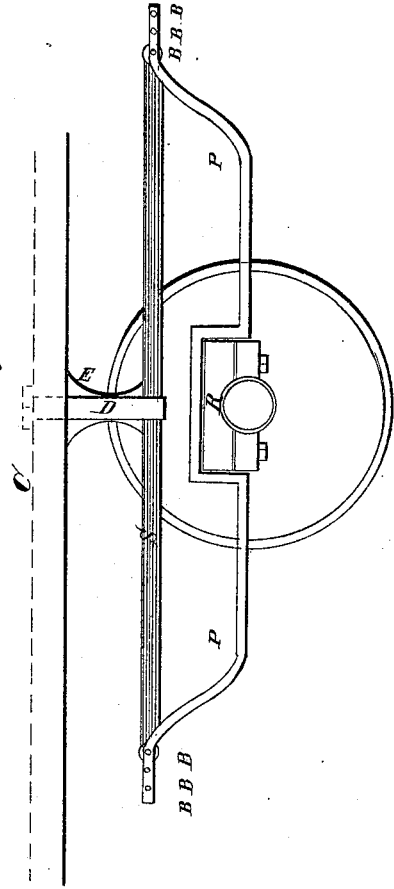
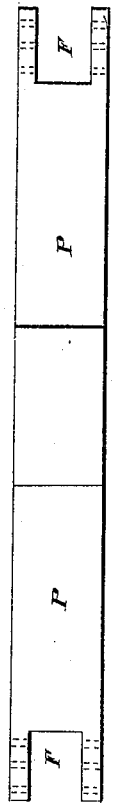
Witnesses.
Hugh McWilliam
Charles Van Gelding
Inventor.
Alexander Hay A. HAY.
Car Spring.
No. 25,264.
2 Sheets—Sheet 2.
Patented Aug. 30, 1859.
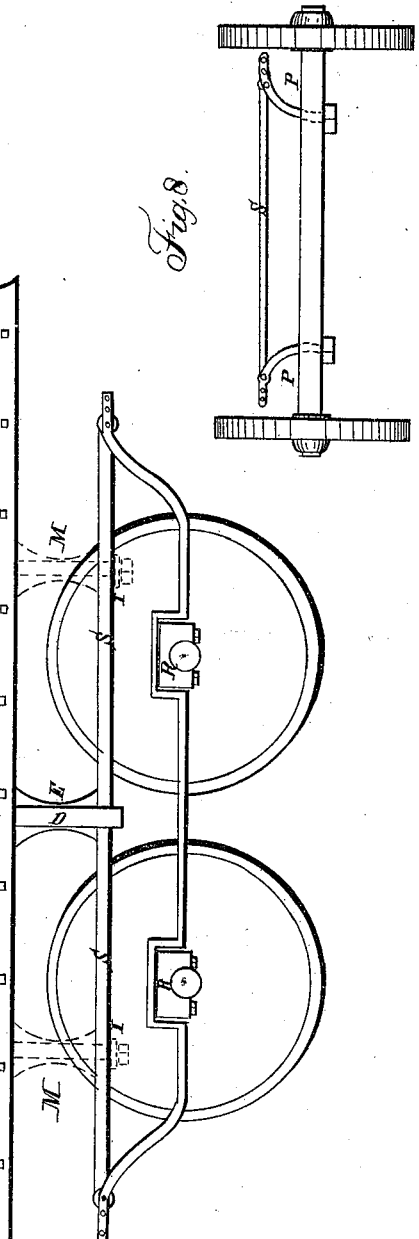
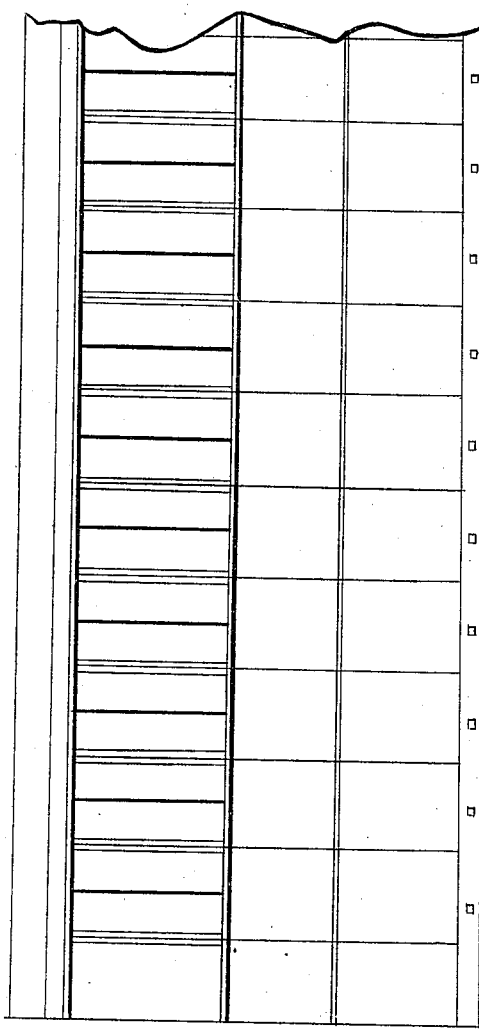
Witnesses.
Hugh McWilliam
Charles De Selding
Inventor.
Alexander Hay

UNITED STATES PATENT OFFICE.

ALEXANDER HAY, OF PHILADELPHIA, PENNSYLVANIA.

SPRING FOR RAILROAD-CARS.

Specification of Letters Patent No. 25,264, dated August 30, 1859.

*To all whom it may concern:*

Be it known that I, ALEXANDER HAY, of the city of Philadelphia and State of Pennsylvania, have invented certain new and useful Improvements in the Construction of Vulcanized India-Rubber Springs for Railway and Common Carriages; and I do declare the following is a full and exact description thereof, reference being had to the accompanying drawings and letters of reference marked thereon.

The nature of my invention consists in the making of vulcanized india rubber springs from shirred or corrugated india rubber fabrics, or from knit elastic india rubber fabrics, and in producing the required elasticity of the spring by tension or by stretching it, and not by compression as is usual in the adaptation of india rubber springs to railway carriages.

To enable others skilled in the art to make and use my invention I proceed to describe its mode of construction and adaptation to the use designed, in which—

Figure 1, represents a top view of the spring S and A A the tubes for holding the spring, with the flange turned up at each end.

Fig. 2, shows a side view of spring S with the tubes and their flanges more distinctly shown.

Fig. 3, a section of the frame of a railroad car with spring S in place, P, the spring supporter resting on the axle box R. B, B, B holes in the ends of the spring supporter for adjusting the spring. C car frame. D yoke for securing the spring to the car. E block interposed between the car and spring on which the car rests.

Fig. 4, a top view of the spring supporter P. F, F, openings for the tubes in the end of the spring to pass between being secured by bolts and nuts as shown in Fig. 3, letters B, B.

Fig. 5, side view of yoke D shown in Fig. 3—without the nuts for securing it which are put on after it has passed up through the frame.

Fig. 6, a view of a yoke differently constructed from that shown in Fig. 5 having one shaft G, extending up through the car frame H, the yoke portion being below the spring. The yoke used in place of a bolt through the spring which would weaken it. I, a plate held up against the spring S, for confining it and secure it in place by nuts K, K—the block or support, which should be interposed between the bar and spring being removed.

Fig. 7, represents the spring supporter P extending from wheel to wheel of a truck or from wheel to wheel of a city rail road car. The car is confined to the spring at its center and also rests on it at two other points M, M secured by yokes as in Fig. 6, the plates I, not being screwed up tight enough to prevent the spring from yielding. Here one spring extending from wheel to wheel is made to answer in place of a separate spring, over each wheel.

Fig. 8, represents the axle fixed as in ordinary carriages, with a separate support for each end of the spring.

The springs may be made of any required strength, and of any required length and width, their construction being governed by the particular purpose for which they are designed and the weight to be supported by them. The fabric out of which the springs are formed is so made as to be elastic up to a certain point, beyond which it must not yield, or only so much, as cannot be prevented; and this is done, by stretching the warps or threads out of which the fabric is made, as much as they will bear, before they are woven or knit, so that when woven the cloth or fabric will yield little if any, to any strain it will bear. If a fabric be so made and then shirred or corrugated and covered or coated with vulcanized india rubber, the degree to which it is shirred will measure the extent of its elasticity. A spring may thus be constructed, and its play regulated with great accuracy, and be made to spring little or much as desired for the shirring limits the play of the spring and beyond this it will be non-elastic or break. The preparation of the warps or threads by stretching, before they are converted into the fabric out of which the springs are made should be applied to any fabric whether knit or woven out of which the springs are to be made.

Having determined how wide and how long a spring is required to be, procure two iron or metallic tubes, in length equal to the width of the spring, with flanges turned up around each end of the tubes as shown in Figs. 1 and 2 letters A, A, A, A, the diameter of the tubes being sufficient to receive a bolt capable of sustaining the strain on the spring. Then place these tubes apart the required length of the spring, each tube being so secured in its place, that the fabric out of which the spring is to be made, may be passed around each tube and each layer of the fabric cemented to the other, until the spring is of the required thickness or strength and completed as shown in Figs. 1 and 2. Each layer is placed on the other straight and smooth, and the fabric, out of which the spring is to be constructed, is made only as wide as the spring so as to surround the tubes and fit in between the flanges turned up around their ends, which flanges correspond in depth with the thickness of the spring.

The springs should be made of one continuous piece or band of rubber fabric, which will cause them to be equally elastic throughout, and not more liable to break at one point than another, or the fabric out of which the springs are to be constructed may be made as stout and strong as desired, so much so that a single thickness of the fabric may be made to possess the required strength, in this event the tubes by which the springs are to be secured and held should be knit or woven into the springs, for it is desirable to prevent any breaking of the fabric at the ends of the springs, where the tubes are inserted, as they bear the whole strain of the springs.

These springs may readily be applied to railway cars, and also to every variety of carriage, and in order to do this, it is only necessary to give to the ends of the spring a firm and rigid support, while the weight to be sustained rests on the spring between the supports, and must by the interposition of a block or otherwise be elevated sufficiently above the supports to admit of the required play of the springs without the frame of the body of the car or carriage touching the supports. Where this spring is to be applied to rail road cars with the axles revolving then the support for the spring may be made as represented in Fig. 3, where the supporter P passes through the pedestal, and fits over the axle box R—like a saddle, being made of sufficient strength for the purpose, with the ends turned up as represented. The supporter fits close around the axle box, and the frame of the box prevents the supporter from tilting up at either end from the varying weight of the spring; but if required the supporter may be secured in its place by bolts passing through the pedestal. The ends of the supporters have an opening for the tubes in the ends of the springs so as they may pass in freely between the sides of the opening as shown in Fig. 4 where F, F represent the openings, and B, B, B, several holes in the ends of the supporter as shown in Fig. 3 for the purpose of tightening or adjusting the spring. This plan is well suited to city rail way cars, or wherever a separate spring may be required over each axle; but the supporter may be extended from axle to axle of a truck frame, and thus use one spring in place of two as in Fig. 7. Where the supporter is long its ends may be stayed or braced, for wherever placed it must be rigid and unyielding. In four wheeled cars it may be made to extend from axle to axle, and beyond, but then the length of the spring would cause the car unless it was confined to the spring at more than one point to rock and have too much motion, and if too rigidly confined to the spring except at the center, it would check the free play of the spring. The spring should be confined to the car body or frame by a yoke clamping the spring, and passing up through the frame and secured with nuts and bolts as shown in Figs. 3 and 7 a side view of the yoke being shown in Fig. 5; or if the frame be not wide enough to permit both ends of the yoke to pass through it and be secured, then the yoke may be made with one bolt or shaft G—as shown in Fig. 6, in which the spring is held in the yoke by a plate —I— confined with nuts and screws. The block or support interposed between the frame H, and spring S being removed to show more distinctly the yoke. If this latter form of yoke is used, the car may be made to rest on the spring at several points and yet allow the spring to act throughout its extent by leaving room between the yoke and plate sufficient for the purpose, but the spring will act best when confined at its center. Each spring in all cases should be made so strong as to support the weight of the car or carriage when empty with out any deflection from a straight line which it should represent when put up, and only yield under the weight of the load.

Where the axle is stationary as in ordinary carriages, the proper mode of attaching the spring will occur to any mechanic— the base of the support for the spring should form a shoe or yoke fitting the axle, and secured to it by bolts and nuts, and where the spring is placed parallel with the axle, it will be best to use two short supports as in Fig. 8. Where the spring is placed at right angles to the axle, the support must be confined at its center securely. In applying the spring, place it between the ends of the supporters, draw it tight and secure it in place by passing bolts through the tubes and supporters and securing them with nuts.

The advantages claimed for these springs are, that they are cheaper, will last longer, and are really more elastic than any india rubber spring yet designed for the same purpose and also that they will in a great degree destroy the noise and jarring produced by the running of the car or carriage, from the fact that the supports for the spring do not rest directly over the axle of the car, as where solid rubber is used; and because the construction of the spring makes it a bad conductor of sound.

I am aware that shirred india rubber has been used for springs in a great variety of ways, as well also as a knit elastic india rubber fabric. I therefore do not claim broadly the use of either of them, but What I do claim as my invention and desire to secure by Letters Patent as a new article of manufacture is—

1. The construction of vulcanized india rubber springs, in which the threads or warp or fabric out of which they are formed are made non-elastic, before they are woven or knit substantially as described.

2. In combination with india rubber springs to be acted on by tension or stretching, I claim the tubes A, A, with their flanges substantially as described for the purpose set forth.

3. In combination with springs operating as described I claim the supporter P with the opening F in each end and holes B, B, B, for tightening the spring, when constructed and operated substantially as set forth.

ALEXANDER HAY.

Witnesses:
CHARLES DE SELDING,
HUGH McWILLIAMS.